United States Patent [19]

Hallock

[11] 4,449,878
[45] May 22, 1984

[54] FLAT CLINCH TYPE NAIL

[76] Inventor: Robert L. Hallock, 7136 NE. 8th Dr., Boca Raton, Fla. 33432

[21] Appl. No.: 298,222

[22] Filed: Aug. 31, 1981

[51] Int. Cl.³ ............................................. F16B 15/00
[52] U.S. Cl. ..................................... 411/495; 411/179
[58] Field of Search ................ 411/495, 179, 446–450, 411/493, 499, 501–503

[56] References Cited

U.S. PATENT DOCUMENTS

| | | |
|---|---|---|
| 167,424 | 9/1875 | Ballou . |
| 585,437 | 6/1897 | Goldie .................................. 441/495 |
| 594,757 | 11/1897 | Richard ................................ 411/448 |
| 692,763 | 2/1902 | Bracey ................................. 411/495 |
| 931,272 | 8/1909 | Columbia ............................. 411/448 |
| 940,083 | 11/1909 | Stimpson ............................. 411/502 |
| 1,930,611 | 10/1933 | Freter ............................... 411/448 X |
| 2,287,843 | 6/1942 | Turzicky . |
| 2,366,962 | 1/1945 | Gair . |
| 2,624,085 | 1/1953 | Feiner . |
| 2,873,447 | 2/1959 | Catlin et al. . |
| 3,095,777 | 7/1963 | Hallock . |
| 3,143,030 | 8/1964 | Muller . |
| 3,292,481 | 12/1966 | Couch . |
| 3,871,264 | 3/1975 | Hallock . |
| 4,003,286 | 1/1977 | Hallock . |
| 4,193,333 | 3/1980 | Hallock . |
| 4,231,280 | 11/1980 | Gross .................................. 411/493 |

FOREIGN PATENT DOCUMENTS 8392 of 1903 United Kingdom ................ 411/448

Primary Examiner—Thomas J. Holko
Assistant Examiner—Lloyd A. Gall
Attorney, Agent, or Firm—Dowell & Dowell

[57] ABSTRACT

A clinch type nail having a generally flat shank with a pair of spaced penetrating portions having inner and outer walls that are disposed in angular relationship with each other and intersect along a generally straight line. The outer walls offer more resistance to penetration than the inner walls when the nail is driven which causes the penetrating portions to clinch inwardly toward each other and capture a plug of the material into which the nail is driven.

8 Claims, 10 Drawing Figures

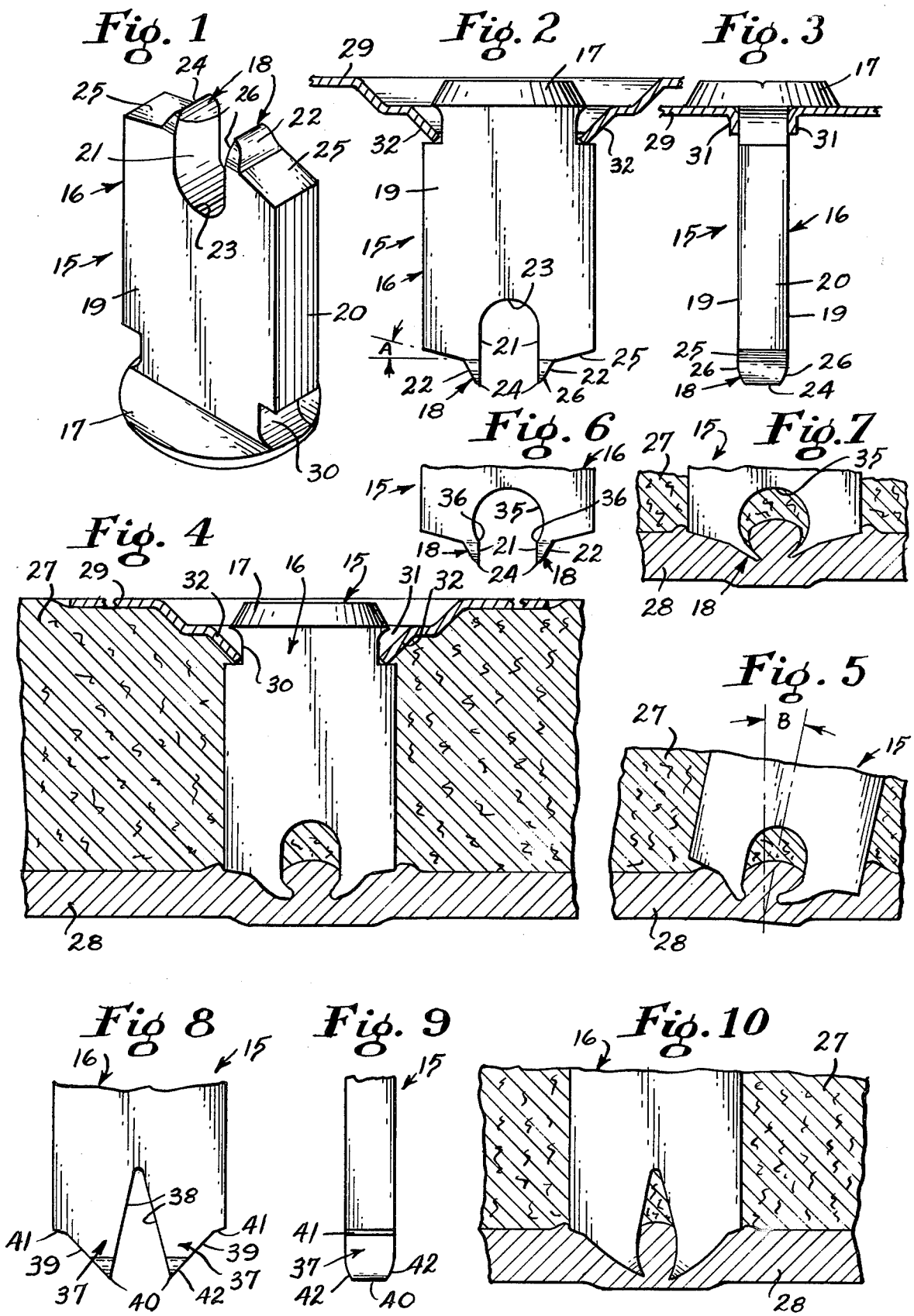

FLAT CLINCH TYPE NAIL

TECHNICAL FIELD

This invention relates generally to nail type fasteners and relates specifically to clinch type nails which are driven into sheet metal and are deformed to capture a plug of material to resist withdrawal.

BACKGROUND ART

Heretofore, many efforts have been made to provide a clinch type nail having multiple prongs which may be driven into a substrate where the penetrating portions of the prongs move toward each other to clinch a portion of the substrate and resist withdrawal. Most of these prior nails have been driven into a relatively soft substrate such as wood or the like as exemplified by the U.S. patents to Tyrzicky, U.S. Pat. No. 2,287,843 and Couch, U.S. Pat. No. 3,292,481.

Other clinch type nails or staples have been provided for driving into a relatively hard dense substrate such as steel or other metal as exemplified by U.S. patent to Catlin, et al., U.S. Pat. No. 2,873,447 and my prior U.S. Pat. Nos. 3,095,777; 3,871,264; 4,003,286; and 4,193,333.

Additionally, the U.S. patent to Ballou discloses a nail having a shank which is generally rectangular in cross-section with a pair of prongs at one end, however, the prongs are bent into engagement with each other before the nail is driven.

Further, some prior art nails such as the U.S. patent to Gair, U.S. Pat. No. 2,366,962 have been provided in which the penetrating end has a pair of spaced portions.

DISCLOSURE OF THE INVENTION

The present invention is embodied in a clinch type nail having a substantially flat shank which preferably is generally rectangular in cross-section and which includes a driving head at one end and a pair of spaced penetrating portions at the other end. Each of the penetrating portions is defined by a generally triangular projection which terminates in a substantially straight line penetrating edge and in which such penetrating edges are generally parallel with each other. The included angle between the side walls of each triangular projection is in the range of 20° to 50°. The nail may be formed in a stamping or punching process from a continuous roll or coil of material of appropriate thickness and of indefinite length and such nail is heat treated after forming to a hardness such that the penetrating portions may bend slightly when driven into a thin substrate such as sheet metal. The configuration of the penetrating portions is such that the penetrating ends clinch inwardly toward each other so as to resist withdrawal and do not pass entirely through the substrate. Due to the configuration of the penetrating portions, the axis of the nail may be driven at an angle of up to 10° from a plane normal to the surface of the substrate. If desired, the nail may be provided with an enlarged disk mounted adjacent to the head and which is used to secure a layer of fibrous insulation to a sheet metal substrate without penetrating entirely through such sheet metal.

It is an object of the invention to provide a flat clinch type nail having spaced penetrating portions, each of which terminates in a substantially straight line penetrating edge and in which the penetrating portions are urged toward each other into clinching engagement when driven into sheet metal and which resists withdrawal from such sheet metal.

BRIEF DESCRIPTION OF THE DRAWING

FIG. 1 is a perspective view illustrating one embodiment of the present invention.

FIG. 2 is a front elevational view thereof with a disk attached.

FIG. 3 is a side elevational view thereof.

FIG. 4 is a sectional view illustrating the nail of FIG. 1 in use.

FIG. 5 is a fragmentary sectional view of a different condition of use.

FIG. 6 is a fragmentary front elevational view of another embodiment of the present invention.

FIG. 7 is a fragmentary sectional view illustrating the nail of FIG. 6 in use.

FIG. 8 is a fragmentary front elevational view of a further embodiment of the present invention.

FIG. 9 is a fragmentary side elevational view of the embodiment of FIG. 8.

FIG. 10 is a fragmentary sectional view illustrating the nail of FIGS. 8 and 9 in use.

BEST MODE FOR CARRYING OUT THE INVENTION

With continued reference to the drawing, a nail or other fastener 15 is provided which includes a body or shank 16 having a driving head 17 at one end and a pair of spaced prongs or penetrating portions 18 integrally formed at the opposite end. Although the shank 16 may be of any desired cross-sectional configuration, it is preferred that such shank be generally rectangular in cross-section and include flat relatively wide front and rear walls 19 and relatively narrow side walls 20 which are generally parallel with the axis of the nail.

With particular reference to FIGS. 1-5, each of the penetrating portions 18 includes an inner wall 21 and an outer wall 22 with the inner walls being generally parallel with the axis of the shank and therefore parallel with each other. Such inner walls extend into the body or shank 11 and are connected to each other by an arcuate generally semicircular wall 23. The opposite end of each of the inner walls terminates at a substantially straight line penetrating edge 24.

The outer wall 22 of each penetrating portion tapers upwardly and outwardly (as shown in FIGS. 1 and 2) from a small radius or chamfer which provides a substantially blunt penetrating edge 24 and intersects a shoulder 25 which forms the bottom surface of the body 16. The shoulders 25 may be disposed generally normal to the axis of the body 16 or, as illustrated, may be disposed at an angle A of up to 20° from a horizontal plane and, preferably, is at an angle of 15° from a horizontal plane. Such shoulders define stops which limit penetration of the nail into the substrate. The angular relationship between the inner walls 21 and the outer walls 22 defines an included angle of substantially 25° to 35° and preferably at an included angle of 30°.

Ordinarily, the nail or fastener 15 is stamped or punched from a strip of sheet metal such as 1050 carbon steel or the like having a desired thickness and thereafter the head 17 is formed integrally with the shank in any desired manner. After being formed, the nail is heat treated to a Rockwell hardness of C45 to C48 which gives the nail substantial strength while permitting slight bending of the penetrating portions 18 without fracturing the same. It is contemplated that in a high speed operation, approximately two to three hundred nails may be formed per minute. Also, it is noted that the nail may be stamped from wire stock which preferably (but not necessarily) has a generally rectangular cross-section.

It has been found that during the stamping or punching operation, the leading portion of the penetrating portions 18 tend to draw downwardly, particularly in the area of the penetrating edge 24. This results in at least one side wall of the penetrating portion being curved out of the plane of the front wall 19 of the body with the result that when the nail is driven such nail may penetrate the substrate unevenly. In order to offset this inherent driving problem, the die of the punch is provided with arcuate raised portions in the area of the penetrating portions 18 which are substantially equal to the draw so that both sides of the penetrating portions 18 are provided with arcuate walls 26 which curve inwardly from the front and rear walls 19.

Although the nail may be of any desired size, which normally is determined by the particular use of the nail, a nail which has been found to be satisfactory includes a shank having a width of approximately 0.187 inch (4.75 mm), a thickness of approximately 0.063 inch (1.60 mm) and a length of 0.450 inch (11.430 mm) from the lower extremity of the head to the penetrating edge 24. The inner walls 21 extend upwardly from the penetrating edge 24 a distance of 0.075 inch (1.905 mm) and the outer walls 22 terminate at a distance of 0.025 inch (0.635 mm) above such penetrating edge. The above dimensions are acceptable when the nail is to be attached to a sheet metal substrate having a thickness in the range of 0.020 inch (0.508 mm) to 0.045 inch (1.133 mm).

Ordinarily, the fastener or nail 15 is used to attach a layer of insulation 27 or the like to a thin base or substrate 28 such as sheet metal in which the nail does not penetrate entirely through the sheet material. Due to the lack of density of the insulating material, it may be desirable to attach an enlarged substantially flat disk or retainer 29 to the nail. In order to do this, a notch or recess 30 extends inwardly from each side wall 20 of the nail 15 and upwardly to a position adjacent to the head 17.

The disk is provided with an opening of a size to accommodate the shank 16 and such opening is formed by slitting the material of the disk without removing any material and bending the material downwardly to provide side flanges 31 and end flanges 32. The natural spring back of the material causes the side flanges 31 to slidably engage the front and rear walls 19 of the nail. The end flanges 32 may be bent into the recesses 30 of the nail so that the disk cannot be removed easily after assembly.

In the operation of this embodiment, the nail 15 may be driven either manually or with a power driven hammer using a force of substantially 50 to 90 p.s.i. The insulation 27 is placed on the base or substrate 28 and such substrate is placed on an anvil (not shown). When the nail is driven, such nail easily penetrates through the layer of insulation into engagement with the substrate. The penetrating edges 24 pierce the upper surface of the substrate and the downward force of the penetrating portions 18 causes substantially more resistance to be applied against the outer walls 22 then is applied to the inner walls 21. This causes the lower portions of the penetrating portions 18 to yield and clinch inwardly toward each other. This movement captures a plug of material of the substrate but the lower portion of such plug remains integrally attached to such substrate. Since the penetrating edges 24 are in a straight line, any tendency of the fastener to rotate is avoided.

It is preferred that the axis of the nail be perpendicular to the upper surface of the substrate when the nail is driven so that the penetrating portions 18 are urged toward each other an equal amount. However, due to the configuration of such penetrating portions, the axis of the nail could be disposed at a slight angle B of from 10° to 15° (FIG. 5) and as long as the major resistance to penetration is applied to the outer walls 22, the penetrating portions 18 will yield and be clinched toward each other.

After the nail has been driven, any tendency toward rotating is eliminated and a pulling force in excess of 100 pounds must be applied to remove the nail. In most instances, when the nail is being removed, the neck portion of the plug of material between the edges 24 must be fractured before the nail may be removed.

With particular reference to FIGS. 6 and 7, another embodiment is illustrated in which the inner walls 21 extend upwardly a short distance from the penetrating edges 24. The upper ends of such inner walls intersect an arcuate wall 35 along generally straight lines 36. The radius of the arcuate wall 35 is greater than one half the distance between the inner walls 21. After being formed, the nails shown in the embodiment may be heat treated to hardness of Rockwell C54 to C56.

When the nail is driven, the penetrating portions or prongs 18 are urged inwardly due to the pressure being exerted on the outer walls 22 which causes such penetrating portions to swing or hinge substantially about the lines 36. Since the penetrating portions are under both compression from the upward force exerted by the substrate) and tension (caused by inward movement of such penetrating portions), such penetrating portions may move inwardly substantially about lines 36 without fracturing, even though the nail has been heat treated to a greater hardness and is more brittle than the nail previously described. Additionally, since the nail is of greater hardness, the penetrating portions 18 are not required to bend inwardly as far as the nail previously described in order to attain comparable holding power and resistance to withdrawal.

With reference to FIGS. 8–10, a further embodiment is disclosed in which the nail 15 includes a body or shank 16 having a pair of spaced penetrating portions as prongs 37. Each of the penetrating portions has an inner wall 38 which tapers downwardly and outwardly (as shown in FIG. 8) from a point contiguous to the axis of the shank 16 to a point remote from such axis so that the opposing inner walls 38 are disposed at an angle in the range of approximately 20° to 30° and preferably is an angle of 25°. Each of the penetrating portions 37 also has an outer wall 39 which tapers downwardly and inwardly (as shown in FIG. 8) and the lower extremity of such outer wall intersects the inner wall 38 along a substantially straight edge 40 which defines a penetrating edge. It is important that the straight edges 40 be generally parallel with each other. The outer wall 39 is disposed at an angle relative to the inner wall 38 and such angle preferably is in the range of 45° to 55°. The upper end of each of the outer walls 39 terminates at a shoulder 41 which extends outwardly to the side wall 20 of the shank and forms a stop which limits penetration of the shank as previously described. Also, both sides of the penetrating portions 37 have arcuate walls 42.

In this structure, the shank of the nail preferably has the same dimensions as the previous embodiments. The inner walls 38 extend upwardly and inwardly from the penetrating edge 40 a distance of 0.130 inch (3.302 mm) and the outer walls 39 extend upwardly and outwardly a distance of 0.050 inch (1.270 mm) from such penetrating edge.

In the operation of this embodiment, when the nail is driven, the straight penetrating edges 40 pierce the upper surface of the substrate and continued downward movement of the nail causes substantially more resistance to be exerted against the outer walls 39 from the inner walls 38. This resistance causes the penetrating portions 37 to clinch or bend inwardly toward each other, as shown in FIG. 10, and capture a plug of material.

I claim:

1. A clinch type nail for driving into metal comprising a shank which is made from a metal stock material, head means formed at one end of said shank, a pair of separate spaced apart penetrating portions formed at the other end of said shank, each of said penetrating portions having inner and outer side walls, said inner and outer side walls of each of said penetrating portions being disposed at an angle relative to one another and intersecting one another so as to form generally straight line penetrating edges, said generally straight line penetrating edges of said penetrating portions extending generally parallel with respect to one another, said outer side walls of said penetrating portions being inclined toward the elongated axis of said shank as they extend toward said straight line penetrating edges, said outer side walls of each of said penetrating portions being inclined toward the elongated axis of said shank toward the straight line penetrating edges at a greater angle than said inner walls of said penetrating portions, said outer side walls presenting a greater resistance to penetration of the metal than said inner side walls, whereby when the nail is driven into the metal the greater resistance to penetration of said outer side walls causes said penetrating portions to clinch inwardly toward each other capturing a strip of metal therebetween.

2. The invention of claim 1 in which said inner side walls of said penetrating portions are generally parallel with the elongated axis of said shank.

3. The invention of claim 1 in which said shank is relatively flat having front, rear and side walls, the cross-section of said shank taken perpendicularly to the elongated axis thereof generally defining a parallelogram.

4. The invention of claim 3 in which said angle between said inner and outer side walls of said penetrating portions is at least approximately 20°.

5. The invention of claim 4 in which said outer side walls curve inwardly toward said elongated axis of said shank to the point of intersection with said inner side walls.

6. The invention of claim 3 in which said penetrating portions are spaced inwardly from said side walls of said shank thereby defining generally planar abutment portions which extend from said penetrating portions to said side walls of said shank whereby said abutment portions limit the penetration of the nail into the sheet metal.

7. The invention of claim 3 in which said head means includes a recess formed adjacent said one end of said shank in said side walls and disk means engaged within said recess and extending outwardly in perpendicular relationship to said shank.

8. The invention of claim 3 in which said inner side walls of said penetrating portions diverge from one another as they extend toward said generally straight line penetrating edges.

* * * * *